Feb. 17, 1931.   R. JOHNSON   1,793,444
INTERNAL COMBUSTION ENGINE
Original Filed Oct. 28, 1925   2 Sheets-Sheet 1
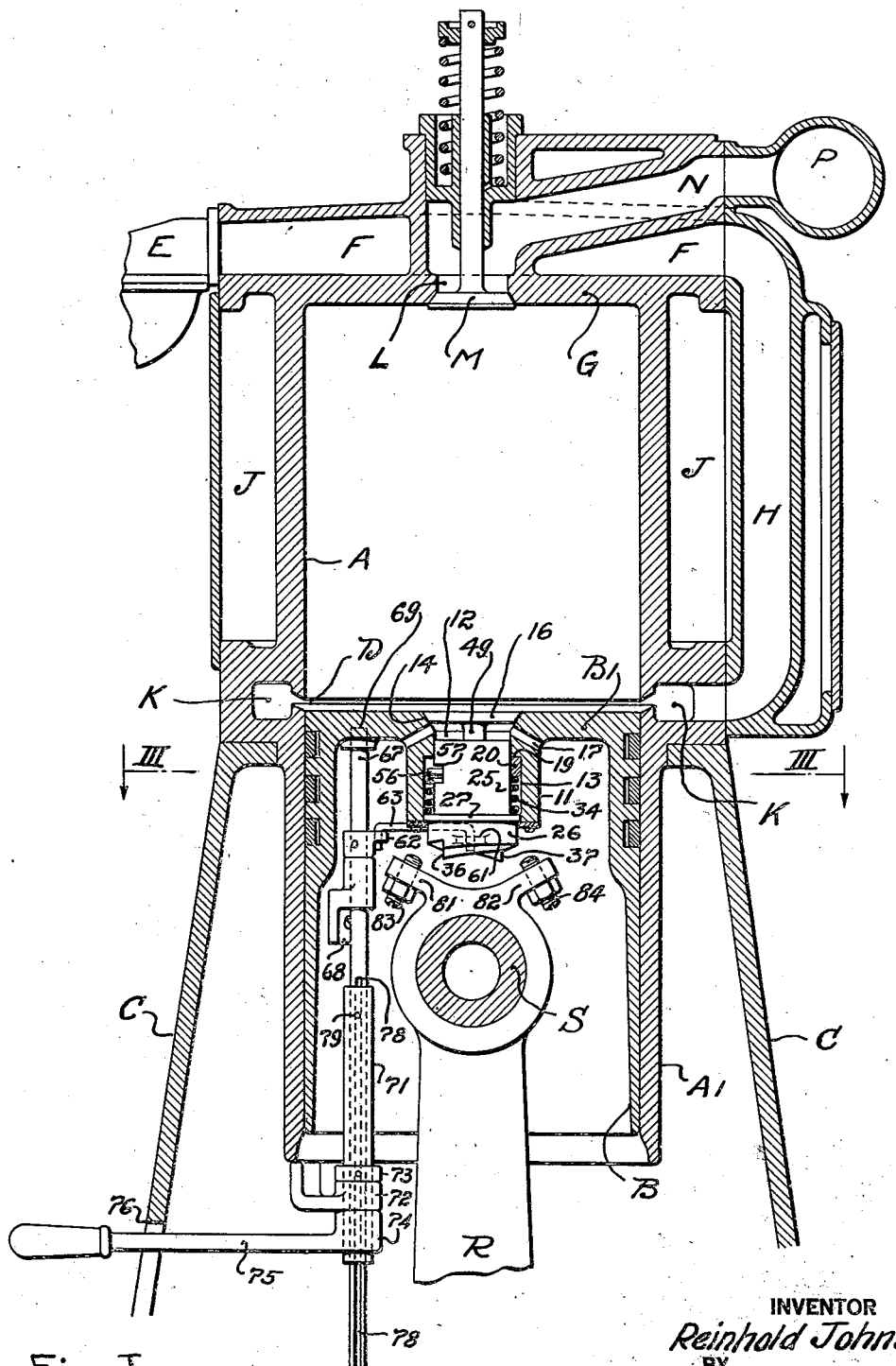
Fig. I
INVENTOR
Reinhold Johnson
BY
ATTORNEY

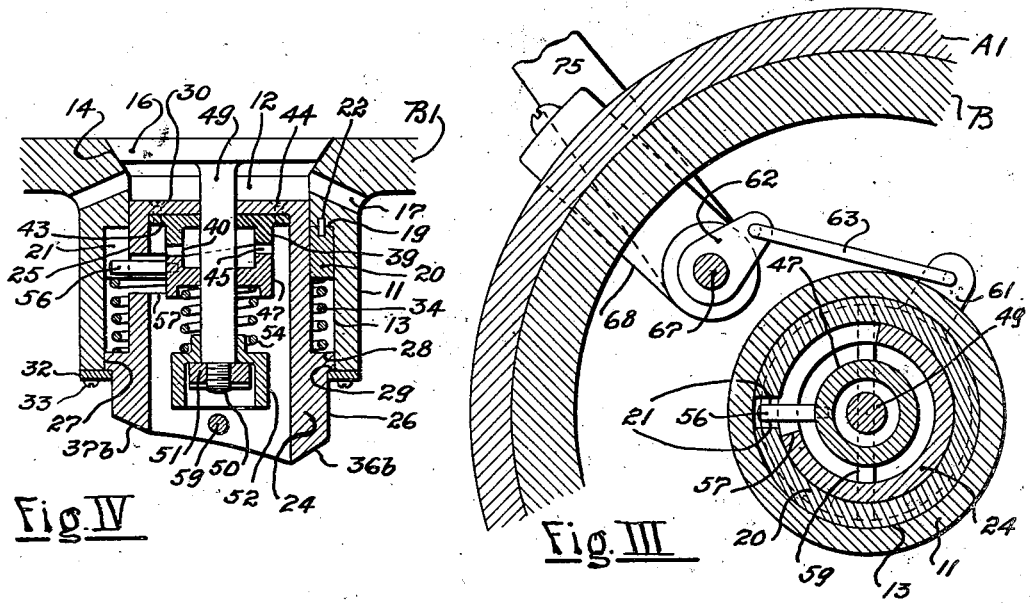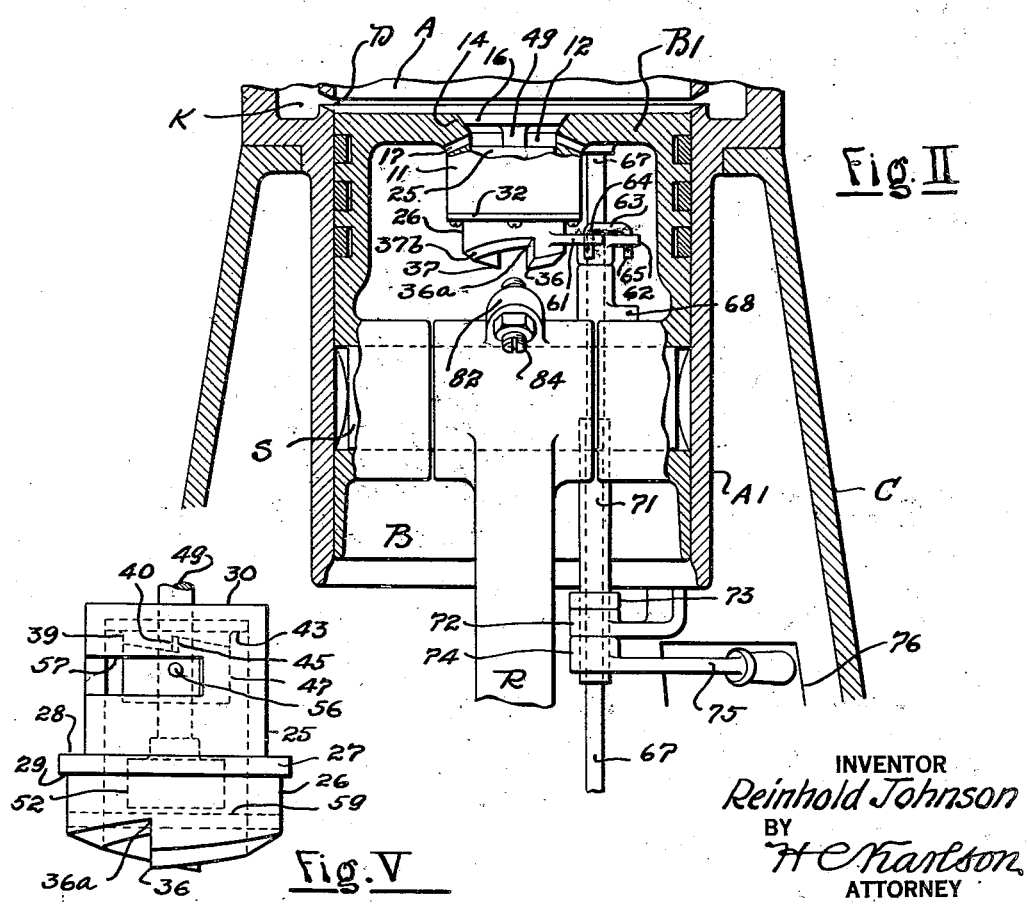

Patented Feb. 17, 1931

1,793,444

UNITED STATES PATENT OFFICE

REINHOLD JOHNSON, OF BROOKLYN, NEW YORK

INTERNAL-COMBUSTION ENGINE

Application filed October 28, 1925, Serial No. 65,406. Renewed May 6, 1930.

This invention relates to so-called two cycle motors and it appertains more especially to that species thereof wherein the steps in the working cycle are caused by the piston alone and occur only on one side of the latter.

In engines of the genus alluded to, particularly of the larger and slower running sizes thereof, the fresh or combustible charge admitted at the end of the working stroke into the closed cylinder before any exhaust has taken place, mixes to a certain extent with the burnt gases then contained in the cylinder, and part of this new charge escapes together with the gases of combustion when the latter are discharged during the return stroke of the piston.

The present invention aims to obviate the above enumerated difficulties, as also others, and the main or primary object thereof is to provide a method and means for operating an engine of the character described, by introducing into its cylinder, when the underpressure is commencing to form therein, between the products of combustion still contained within the cylinder and the ready, mixed combustible charge about to enter the same, an insulating stratum of air alone, serving to prevent intermingling of the new charge with the burnt gases, as well as to preclude part of the former from passing out with the latter, upon the exhaust or return stroke of the piston.

Another object in the production of a method and means of the class mentioned for introducing a stratum of insulating air, is to govern the timing of the underpressure and the thereupon depending amount of fresh charge entering the cylinder of the engine.

A further object is to produce a method and means of the nature set forth for introducing into the cylinder of the engine, a stratum of insulating air, of a quantity larger than is intended to be retained therein, in order to vary the compression of the remaining balance filling of new charge.

Still another object consists in producing valve means for association with a motor of the kind referred to, for governing the admission of a stratum of insulating air into the cylinder of the engine, which means has the opening movement thereof opposed by a resistance regulatable while the engine is running so as to compensate for variations in working conditions during its operation.

A still further object resides in providing a valve means for the purpose in view, so arranged that the permitted opening movement thereof is positively predetermined while its closing occurs automatically and only at proper times.

An additional object is the provision of a valve means of the type specified, so constructed as to predetermine the relative positions in the travel of the piston at which the valve is to become operative to admit a stratum of insulating air, and when this valve should close to control the quantity of fresh combustible charge taken into the cylinder.

A general object is an internal combustion engine employing a method and means of the species implied, so as to be productive of increased efficiency, flexible to accommodate itself to varying loads, enabling the engine to be readily started or reversed, easily controlled, reliable in operation, besides of simple, practical and strong construction.

Other objects and advantages of the invention will become apparent as the specification proceeds.

With the aforesaid objects in view, the invention consists of the novel combinations and arrangements of parts hereinafter described in their preferred embodiments, pointed out in the subjoined claims, and illustrated on the annexed drawings, wherein like parts are designated by the same reference characters throughout the several views.

Generally described, the improved method under consideration, consists in expanding all of the burnt gases until the pressure within the cylinder is reduced to less than that of the atmosphere, admitting a stratum of air only while maintaining a partial rarefaction within the closed cylinder; opening the same at or near the outstroke of its piston so that a new combustible charge will of itself enter the cylinder by reason of the underpressure existing therein, the air stratum separating the burnt gases still contained in the cylinder from the new charge having entered therein; forcing out the former ahead of the latter upon the piston's return stroke, a portion of the air stratum being permitted to pass out with the exhaust gases, but preventing the new charge from escaping; entrapping more or less of the air stratum together with all of the new charge for compression, which takes place during the last part of the return stroke; and thereafter igniting the new charge spontaneously by compressing it either alone or against a cushion of the supplementary air stratum remaining in the cylinder.

The means used for carrying out the principles of the invention, comprises in combination with the cylinder of an internal combustion engine having inlet and outlet ports at opposite ends thereof, and provided with a positively actuated exhaust valve which coacts with the outlet port, the reciprocating piston in the cylinder controlling the admission of the new charge through the inlet port. Such an engine has its piston furnished with a supplementary valve by way of which is admitted into the cylinder adjacent to the face of the piston a stratum of air. The amount of lift of this valve as well as the resistance exerted thereon is regulatable while the engine is running. Mechanism is supplied for positively releasing the supplementary air valve so that the same will move off its seat so soon as the required partial vacuum is forming within the cylinder by virtue of continued travel therein of the piston. When the rarifaction existing within the cylinder is less than the resistance acting upon this valve, the latter will either remain shut or else close immediately these conditions prevail. As soon as the piston at the end of its outstroke uncovers the inlet port, the new or fresh combustible charge will rush into the cylinder. The quantity of new charge that enters the cylinder is controlled by the intensity of the vacuum therein, which in its turn, is dependent upon the spring resistance against the supplementary air inlet valve. The new charge upon entering the cylinder displaces from the face of the piston the air stratum adjacent the same. But, this air acts as a buffer in preventing the new charge from coming into direct contact and mixing with the burnt gases still contained in the cylinder. The valve controlling the outlet port begins to open at the same time as the piston commences to move towards the latter. The now inert burnt gases are driven out ahead of the air stratum intervening between it and the new combustible charge. Before the exhaust valve closes at the last quarter of the piston's return stroke, some of the air stratum may pass out with the burnt gases. This depends upon how much of the supplementary air was taken into the cylinder during the inhalation part of the outstroke, still none of the new charge is permitted to escape. The compression of the latter, which subsequently takes place, forces the same either alone in direct contact with the head of the cylinder or against some of the intervenient air stratum entrapped in the cylinder. Ignition of the new charge occurs spontaneously as well as simultaneously throughout the entirety thereof and is due solely to the heat generated by the compression which can be regulated to suit the volatility of the hydro-carbon used.

The advantages of the invention as here outlined are best realized when all of its features and instrumentalities are combined in the one and same structure, but, useful devices may be produced embodying less than the whole.

It will be obvious to those skilled in the art to which the invention appertains, upon becoming conversant with the details thereof, that the same may be incorporated in several different constructions. The accompanying drawings, therefore, are submitted merely as showing the preferred exemplification of the invention.

In the said drawings:—

Figure I is a vertical section through the upper part of an internal combustion engine, illustrating one embodiment of the invention;

Fig. II is a sectional elevation of the lower portion of the preceding figure, the parts being viewed in a different direction from the latter;

Fig. III is a fragmentary sectional plan view taken on the line III—III of Fig. I looking down according to the thereto appertaining arrows;

Fig. IV is an enlarged section taken in a vertical direction through the supplementary air-inlet valve and an adjacent portion of the piston corresponding to the position thereof shown by Fig. I; and Fig. V is an exterior side elevation of a cage or housing for the above named valve.

Referring now to the aforesaid views of the drawings hereto annexed, for a detailed description of the invention, the known elements of an internal combustion motor, and the parts wherewith the same are associated, have been denoted by reference letters. Of the latter A designates the cylinder of a vertical type of engine wherein reciprocates, as usual, a truncated piston B, which as shown, is at the end of its outstroke, being guided within a sleeve-like extension A1 of the cylinder. Portions of the frame supporting the latter is depicted at C. In the position mentioned, the head or end B1 of the piston uncovers a circumferential inlet port D through which enters the new or fresh combustible charge that can be either in a ready mixed gaseous state, or else may consist of air whereto a liquid hydrocarbon is subsequently added. In the present exemplification of the invention, this charge may be atomized in a carburetor, part whereof is indicated at E. From the carburetor the new charge is conducted for complete vaporization of entrained particles of fuel, through a passage E extending over the unjacketed head G of the cylinder. Thence the dried charge is led by way of a conduit H which passes through and is cooled by the same medium that circulates in the jacket J surrounding the cylinder A. During its travel through the conduit H, the new charge becomes densified so that a larger volume thereof will enter the cylinder by way of the port D. This inlet stands in communication with the cooling conduit H through an intermediate annular distributing channel K. At the opposite end of the cylinder the head G thereof is provided with an outlet L controlled in the ordinary manner by a mechanically operated valve M. The exhaust gases are conveyed from the exit port L through a duct N to an exhaust pipe or manifold P. Motion from the piston to a crank (not shown) is transmitted, as is commonly done in prime movers of this kind, by means of a connecting rod R, the upper portion of which is represented as engaging a wrist-pin S, suitably carried from the sides of this piston.

The mechanism for controlling the admission of the supplementary air to the engine cylinder, as well as the method whereunder the same operates, which are the salient features of the present invention will now be particularly described.

From the underside and centrally of the end B1 of the piston, depends a hollow boss 11 that is provided with concentrically aligned bores 12, 13, of different diameters. The upper portion of the smaller bore 12 communicates directly with the interior of the cylinder A through the piston's end or head, and the inner edge of the last named bore is bevelled as shown at 14, constituting a seat. Coacting with the latter is the face of a valve 16, serving to regulate the flow of the supplementary air into the cylinder. Below the seat 14 the sides of the boss 11 are pierced by circumferentially spaced apertures 17 adapted to conduct the air into the cylinder by way of the bore 12, i. e., when the valve 16 is raised off its seat.

Intermediate the adjoining inner ends of the bores 12, 13, is formed an abutment 19, against which and through the larger bore 13, is forced a collar 20, the internal diameter whereof coincides with that of the bore 12. Said collar has at one side a gap or guide way 21, and is held from rotation by means of a dowel 22 (see Fig. IV).

A shell-like cage 24 is divided into upper and lower cylindrical neck portions 25, 26, respectively, by an intermediary peripheral enlargement 27, which at each side thereof, produces with the aforesaid necks, top and bottom shoulders 28, 29, respectively. Of these neck portions, the upper, 25, is longer in an axial direction than the lower one 26, but of smaller diameter than the latter. Transversely surmounting and preferably formed integral with the cage 24, is a partition 30. The said necks 25 and 26 have both a sliding and turning fit within the corresponding bores 12 and 13, respectively of the boss 11, the smaller neck 25 being guided besides interiorly of the collar 20.

The shoulder 29 bears normally upon the inwardly overhung ledge-like face of an annular retainer 32, secured as for instance by screws 33 to the lower extremity of the boss 11. The instrumentality for urging the cage 24 into its lowermost position and to yieldingly resist a force acting upwardly thereon, consists, as represented at 34, of a coil spring interposed between the upper shoulder 28 of the flange 27 and the underside of the collar 20. With the bottom face of the lower neck 26 are formed diametrically opposed, ratchet-tooth shaped cam-projections, in the present instance a pair whereof are indicated at 36, 37. These projections wind in helical arrangement around the underface of the neck 26, rising or inclining gradually from the inner points, one of which is visible at 36a, to the outer points (36, 37), constituting the cam-teeth proper. Furthermore, the said outermost places may be abruptly offset one from the other on the flank of each tooth, which, as indicated, extend in a substantially radial direction. Moreover, it will be observed that the aforesaid cam-teeth are made bevelled or flaring outwardly as denoted at 36b, 37b, for a purpose which will be more fully hereinafter referred to.

From the inner or underside of the partition 30, depends an inverted, annularly formed cam 39 having vertically disposed teeth 40 on the order of a so-called crown-gear. As represented at 43 this cam is provided with a rim into which is tapped screws 44, retaining the said cam in its assigned position. Reversely conforming to the teeth 40 and coacting therewith, are similar teeth 45 pertaining to another annulus-like crown-cam 47 disposed in converted relation to the first named cam 39. Through both of the aforementioned cams and the partition 30, passes centrally thereof a stem 49, extending downwardly from the supplementary air valve 16. Onto the lower shouldered terminal 50 of this stem is threaded a nut 51 upon which rests a cup-shaped washer 52, the bottom edge whereof projects below that of the said nut.

A compression spring 54 placed between the cam 47 and the cup-washer 52, around the stem 49, not only urges the teeth 45 and 40 of the aforementioned annular or crown-shaped cams into engagement, but forces also the valve 16 against its seat 14. From one side of the cam 47 projects a finger 56 which may be on the order of a pin that extends through an arcuate slot 57 provided in the wall of the upper neck portion 25. The free end of this finger is guided within the gap 21 formed with the collar 20. At 59 is shown a rod or small bar that reaches across the mouth or open extremity of the cage 24 and is carried by its ends in the opposite walls of the lower neck 26 thereof, a predetermined distance below the bottom edge of the cupped washer 52.

From the foregoing it will be understood, that if the cage 24 is displaced in an axial direction upwardly, the rod 59 will strike against the depending edge of the washer 52 and raise the same off the nut 51 without in anywise affecting the valve 16 or the stem 49 thereof, as this washer as well as the cams 47, 39 and the partition 30 are slidable on or with respect to the said stem. If now a vacuum is forming within the cylinder A in the manner hereinbefore described, the rarefaction acting upon the comparatively large area of the valve 16 will lift the latter off the seat 14, as it is only the relatively light-weight of the valve, the stem and the nut 51 which the air pressure has to overcome. This is due to the fact that the force exerted by the spring 54 has been relieved when raising of the washer compresses it. At such times as the cage 24 is turned within the bores 12, 13, the pin 56 engaging the guide way 21 holds the lower cam 47 from being revolved. Still interrelative rotation occurs between the teeth of the lower cam and the upper one 39 because of the turning motion imparted to the latter. As soon as this movement takes place, the interengaging cam-teeth 45, 40, ride up on the high points or surfaces of one another, whereby the said lower cam is pushed down or lowered. The result hereof is that the spring 54 which keeps the valve closed, is further stressed, so that a stronger vacuum is required to lift the valve off its seat in order to admit a charge of supplementary air into the cylinder of the engine.

The means for partially revolving the cage 24 may consist of an arm 61 extending out from one side of its lower neck 26. As shown, this arm is coupled up to a crank-lever 62 by means of a link 63. The terminals of the latter, can if desired, be bent right angularly as at 64, 65, so as to constitute pivotal connections with the free or outer ends of the said arm and lever 61 and 62 respectively. It will be noticed that the bent portions or shanks 64, 65 are of sufficient length to permit interrelative displacement between them and the arm 61 or the crank-lever 62 when the cage is moved axially within the boss 11. The lower extremities of these shanks may have split pins or like contrivances passed therethrough in order to prevent the link 63 becoming disassociated from its connections.

The before named crank-lever 62 is affixed to a spindle 67 which is disposed in parallelism with, but in offset relation to the axis of the piston B. This spindle is journalled in a bracket 68 fastened in any suitable manner to the inside wall of the piston, the upper terminal of said spindle being further guided in a recess 69 provided in the underside of the piston's end B1. The lower part of the spindle 67 is slidable within a sleeve 71 which passes through another bracket 72 secured to the exterior of the cylinder extension A1. This sleeve is held against endwise movement in said bracket 72, by a collar 73 and the hub 74 of a hand-lever 75, contacting with the top and bottom faces respectively of the said bracket. The handle part (75) of the last mentioned lever, reaches outwardly beyond the frame C, through a laterally elongated opening 76 affording the said handle arcuate swinging movement therein. With the major and lower portion of the spindle 67 is formed transversely thereof, a slot 78 across which near the top of the sleeve 71 runs a pin 79. By means of the latter, oscillatory movement is transmitted from the handle 75 through the sleeve 71 to the spindle 67 and thence by way of the crank 62 and the link 63 to the cage 24. The movement outlined can take place without in any way interfering with the reciprocatory motion of the piston and the spindle 67 carried thereby. Thus it will be seen that the tension of the spring 54 opposing the opening of the valve 16 is capable of regulation while the engine is running. Similarly, the position of the cam-teeth 36b, 37b, may be predetermined to suit different conditions under which the engine is operating.

From Figs. I and II it will be noticed that the upper portion of the hub of the connecting rod R that takes around the wrist-pin S, has formed therewith branched ears 81, 82. Through said ears which preferably stand in angular relation to one another, are respectively threaded set-screws 83, 84, which are held from working loose by means of jam-nuts or the like. The upper ends of these set-screws project above the said ears and are adapted when the connecting rod swings or oscillates from side to side, to contact with and exert a thrust against one or the other of the bevelled faces 36b, 37b of the cam-teeth 36, 37 respectively. This of course depends upon the position the latter are made to assume, through the angular adjustment of the cage 24 by the arm 61 and the therewith connected linkage hereinbefore referred to.

The result of this pushing action by one or the other of the abutment screws (83, 84) against a tooth of the external cam (36, 37), is the raising of the cage 24 in opposition to the pressure of the outer spring 34. Simultaneously as this occurs, the stress exerted by the inner spring 54 on the valve-stem nut 51 through the intervening cup-washer 52, is relieved. This is because the distance intermediate the said washer 52 and the lower crown-cam 47 is correspondingly increased. From the foregoing it will be understood, when the rarefaction takes place within the cylinder of the engine, that the supplementary air-inlet valve 16 will lift earlier and also higher off its seat, by virtue of the resistance thereon being reduced. The timing or period of the stroke in which the said valve should be liberated as well as the amount of movement permitted the same, is determined by the position the lowermost cam-surfaces are made to assume. It is obvious, the closer these surfaces stand with respect to the arcuate path traversed by the adjacent ends of the abutment screws, the greater the motion imparted to the cage 24. Conversely, when the receding portions (36a, 37b) of the cam-teeth are presented to the aforementioned screws, the smaller the distance that the cage 24 is raised, and consequently the downward thrust upon the valve stem 49 by the spring 54, is lessened only slightly.

The supplementary air-inlet valve 16 in admitting air into the cylinder breaks the vacuum forming therein, but only partially, as continued travel of the piston tends constantly to create additional vacuum or to maintain the same all the time. The weight of the valve, the stem and nut which the atmospheric air has to overcome during its entrance into the cylinder also increases the vacuum required. Obviously additional load imposed on the valve by the adjustment of the spring 54 necessitates a considerable vacuum to overcome the same. When starting the engine it is necessary to increase the resistance on the supplementary air inlet valve as a strong vacuum is then needed to produce sufficient rarefaction within the cylinder in order to inhale a full charge of combustible mixture. At such times as the engine is running light, that is, when the load or work it has to do is thrown off, the resistance or the pressure upon the supplementary valve should be relieved or reduced to a minimum in order to admit as large a quantity of buffer air as possible and as small amount of fuel mixture as is required to operate the engine.

From the foregoing it will be comprehended, that during the cycle of operations, the ignited charge expands in the closed cylinder until the pressure falls below a certain vacuum for which the supplementary inlet valve 16 is adjusted. A charge of buffer air then enters the cylinder through this valve displacing the burnt gases from the face of the piston. Continued travel of the latter maintains rarefaction within the cylinder until the piston uncovers the port D, whereupon a charge of combustible mixture is admitted before any exhaust occurs. Thus there is contained in the cylinder strata of burnt gases, buffer air and combustible mixture. The latter is separated from the one first named by the buffer charge. The exhaust valve opens upon the return stroke of the piston which drives out the now inert exhaust gases ahead of the buffer and combustible charges. Part of the buffer air is permitted to escape with the exhaust gases, but this buffer charge prevents the combustible mixture from passing out or mingling with the burnt gases. The sooner the pressure of the expanding gases of combustion fall below that of the intake or atmosphere, the quicker the buffer air enters the cylinder. When the engine is doing its maximum work, the amount of buffer air is kept small, while the charge of combustible mixture is proportionately large and vice versa during a light load. The power of the engine can be controlled by the simple expediency of regulating the resistance upon and the lift of the supplementary air inlet valve.

Notwithstanding that a certain preferred embodiment of this device has been shown and described, it will be understood that changes in the form, arrangements, proportions, sizes and details thereof may be made, without departing from the scope of the invention as defined by the appended claims.

Having described my invention what I desire to secure by Letters Patent and claim, is:—

1. The method of operating a two-cycle internal combustion engine, which consists in controlling the admission of free air at atmospheric pressure into the cylinder on the outstroke to partially relieve a partial vacuum produced therein by the expansion of the burnt gases, and fully relieving said partial vacuum by the admission of a combustible charge also at atmospheric pressure immediately upon completion of said stroke.

2. The method of operating a two-cycle internal combustion engine, consisting of partially relieving a partial vacuum produced by the expansion of the burnt gases in the cylinder thru the introduction therein of a charge of raw air at atmospheric pressure progressively during the outstroke to control the condition of the vacuum, and fully relieving said partial vacuum by the introduction of a combustible charge also at atmospheric pressure to the cylinder at the outer end of the outstroke before any exhaust has taken place, both of said charges entering the cylinder solely on account of the rarefied conditions existing therein.

3. The method of operating a two-cycle engine by the combustion of an ignitible charge, which consists in uninterruptedly expanding the burnt gases in the cylinder until a partial vacuum is produced therein, controlling the admission of supplementary air at atmospheric pressure into the cylinder during a portion of the outstroke while maintaining the vacuum produced, and opening the cylinder at or near the end of said outstroke so that a new combustible charge also at atmospheric pressure will enter solely by virtue of the then existing partial vacuum prior to the exhaust taking place.

4. The method of operating a two-cycle engine by the combustion of an ignitible charge, which consists in expanding all of the burnt gases in the closed cylinder until an underpressure is produced therewithin on the outstroke, admitting and controlling the entrance of a supplementary charge of air at atmospheric pressure into the cylinder through the underpressure produced therein which is maintained during said stroke, the air charge entering the cylinder against the expanded burnt gases contained in the same, and opening the cylinder so that a new combustible charge also at atmospheric pressure will of itself enter thereinto solely on account of the existing underpressure prior to the exhaust being opened, the new charge flowing into the coolest part of the cylinder at or near the end of said outstroke and displacing the air charge, the latter separating the new charge from the burnt gases.

5. The method of operating a two-cycle engine by the combustion of an ignitible charge, which consists in expanding the burnt gases until the pressure thereof during the outstroke is reduced to less than that of the intake, admitting a buffer charge of air at such pressure into the cylinder only during the continued outstroke while maintaining and controlling the reduced pressure, opening the cylinder so that a new combustible charge also at said pressure will spontaneously enter thereinto by virtue of the difference between terminal and reduced pressures at or near the end of said outstroke prior to the exhaust being opened, the new charge being separated from the burnt gases by the buffer charge adjacent thereto, forcing out the burnt gases ahead of the buffer charge upon the return stroke, a variable portion of the buffer charge being permitted to escape while the exhaust takes place, and compressing the new charge together with any remaining portion of the buffer charge at the latter part of the return stroke.

6. The method of operating a two-cycle engine by the combustion of an ignitible charge, which consists in expanding the burnt gases in the cylinder until an underpressure is produced therewithin, controlling during an intermediate period of the outstroke the admission of a supplementary charge of air at atmospheric pressure into the cylinder through the underpressure produced and maintained therein, opening the cylinder so that a new combustible charge also at atmospheric pressure will enter the coolest point thereof by virtue of the existing underpressure at or near the end of said outstroke before opening the exhaust, the air charge serving as a buffer separating the new charge from the burnt gases, driving out the latter ahead of the buffer air charge upon the return stroke, a variable portion of the buffer charge being permitted to escape together with the exhausted burnt gases, stopping the exhaust and compressing the new charge against any entrapped portion of the buffer charge, and causing spontaneous ignition by compression of the combustible charge which comes into contact with the hottest region of the cylinder only at the last part of the return stroke.

7. In a two-cycle internal combustion engine a cylinder and a piston movable therein, a valve in said piston adapted to admit raw air at atmospheric pressure to partially relieve and control a partial vacuum forming in said cylinder only while the piston moves outwardly, and a port opening to the cylinder when the piston reaches its limit of travel, said port being capable of supplying a combustible mixture also at atmospheric pressure to the cylinder to fully relieve the vacuum therein before the exhaust takes place from said cylinder.

8. A two-cycle internal combustion engine including a cylinder, a piston allowing the burnt gases to expand uninterruptedly until a partial vacuum is produced within said cylinder, means controlling the admission of supplementary air alone at atmospheric pressure into the cylinder only while continued outward travel of said piston maintains the vacuum produced, and other means affording ingress into the cylinder of a new combustible charge also at atmospheric pressure when the piston is at or near the end of its outstroke before any exhaust has taken place.

9. A two-cycle internal combustion engine including a cylinder, a piston allowing the burnt gases to expand until an underpressure is produced within the closed cylinder, means admitting and controlling a supplementary charge of air at atmospheric pressure entering said cylinder only while continued outward travel of said piston maintains the underpressure produced therein, said means directing the air charge adjacent to the face of the piston against the burnt gases contained in the cylinder, and other means providing inlet of a new combustible charge also at atmospheric pressure into the underpressure existing in the cylinder before any exhaust has taken place therefrom on the piston's outstroke, said other means permitting the new charge to enter the coolest part of the cylinder on the side of the air charge away from the burnt gases when the piston is at or near the end of its said outstroke.

10. A two-cycle internal combustion engine of the character described, including a cylinder having an exhaust port, a piston allowing the burnt gases to expand until the pressure thereof is reduced to less than that of the atmosphere of intake on the outstroke, means controlling a buffer charge or air admitted into said cylinder during continued travel of said piston so as to maintain the reduced pressure, other means affording before the exhaust has taken place spontaneous ingress of a new combustible charge at normal pressure into the reduced pressure existing in the cylinder when the piston is at or near the end of its outstroke, the previously admitted buffer charge serving to separate the new charge from the burnt gases still contained in the cylinder, the piston on the return stroke forcing out the burnt gases together with all or a part of the buffer charge through said exhaust port, and a valve controlling the latter to cause compression of the new charge alone or against an entrapped portion of the air buffer charge.

11. A two-cycle internal combustion engine including a cylinder having inlet and exhaust ports at the outer and head ends thereof respectively, a piston provided with air admission means reciprocable in said cylinder and adapted to uncover said inlet port at or near the terminal of its outstroke, said piston allowing the burnt gases to expand until an underpressure is produced in the cylinder on the outstroke, said means controlling a buffer charge of air at atmospheric pressure admitted into the cylinder only at an intermediate portion of said outstroke of the piston, said buffer charge entering the cylinder due to the underpressure therewithin which is maintained by continued outward travel of the piston, the uncovering of the inlet port affording before any exhaust has opened ingress of a new combustible charge also at atmospheric pressure into the coolest part of the cylinder, the new charge passing into the latter by virtue of the therein existing underpressure, being separated from the burnt gases by the previously admitted buffer charge, the admission of the buffer and the new charge depending upon the rarefied condition of the burnt gases within the closed cylinder and taking place adjacent to the face of the piston, and a valve controlling said exhaust port permitting the burnt gases to be driven out together with some of the buffer air ahead of the new charge by the piston on its return stroke, said valve closing the exhaust port during the latter part of the return stroke so as to entrap more or less of the buffer air and the whole of the new charge to vary the compression, further inward travel of the piston compressing the new against the remainder of the buffer charge until spontaneous ignition occurs of the new charge, the same coming into contact with the hottest region of the cylinder only at the last part of the return stroke.

12. A two-cycle internal combustion engine including a cylinder, a piston provided with an admission for supplementary air reciprocable in said cylinder allowing the burnt gases to expand until an underpressure is formed within the latter on the outstroke, said supplementary air being admitted at atmospheric pressure only during said outstroke of the piston and subsequent to the combustion of the burnable gases before the exhaust has taken place, and means for regulating the admission of air through said piston at a predetermined underpressure of the burnt gases.

13. A two-cycle internal combustion engine including a cylinder, a piston reciprocable therein allowing for expansion of the burnt gases to an underpressure thereof in the closed cylinder on the outstroke, said piston being provided with an admission valve for supplementary air at atmospheric pressure only during said outstroke and subsequent to the burning of the gases of combustion but before the exhaust has taken place, and means for regulating the point in the outward stroke of said piston at which said valve is to admit the air into said cylinder after the underpressure has formed therein.

14. A two-cycle internal combustion engine including a cylinder, a piston allowing the burnt gases to expand within the closed cylinder until an underpressure is formed therein on the outstroke, said piston having a supplementary inlet valve admitting air at atmospheric pressure only during said outstroke and after the burning of the gases of combustion has taken place within the cylinder prior to the exhaust being opened, and means operable during the piston's movement to regulate the inlet of air through said valve into said cylinder subsequent to forming of the underpressure.

15. A two-cycle internal combustion engine including a cylinder, a piston movable therein allowing for expansion of the burnt gases to an underpressure thereof in the closed cylinder on the outstroke, a valve adapted to admit supplementary air into said cylinder carried by said piston, said air entering the cylinder at atmospheric pressure only during said outstroke and following the combustion of the burnable gases in advance of the exhaust being opened, and positive means for varying a resistance imposed on said valve to regulate the period in the said outstroke at which the air is to be admitted after the underpressure has formed in the cylinder.

16. In an internal combustion engine of the character described, including a cylinder, a piston reciprocable therein allowing for expansion of the burnt gases, a spring-opposed valve carried by said piston adapted to admit supplementary air into said cylinder, and means for regulating the resistance of the spring on said valve during the reciprocations of the piston so as to vary the period in the outstroke thereof at which the air admission is to take place.

17. An internal combustion engine of the character described, including a cylinder, a piston reciprocating therein allowing for expansion of the burnt gases, a supplementary air valve carried by said piston, means for governing the opening movement of said valve to control the amount of air entering said cylinder, and other means actuating the air valve in timed relation with the reciprocations of the piston.

18. An internal combustion engine of the character described, including a cylinder, a piston reciprocable therein allowing for expansion of the burnt gases, a spring opposed valve carried by said piston adapted to admit supplementary air into said cylinder, means for graduating the resistance of the spring against the opening of said valve, and a telescopic connection between the piston and a stationary part of the engine capable of being actuated during operation of the latter for the setting of said means.

19. A two-cycle combustion engine including a cylinder, a piston reciprocable therein allowing for expansion of the burnt gases to an underpressure on the outstroke in the closed cylinder, a supplementary valve carried by said piston admitting air at atmospheric pressure only during said outstroke and subsequent to the combustion of the ignitible gases but before the exhaust thereof, a pitman driven by the piston, and means actuated direct by said pitman effecting opening of said valve to admit the supplementary air into said cylinder after the underpressure has formed therein.

20. An internal combustion engine of the character described, including a cylinder, a piston therein allowing for expansion of the burnt gases, a valve carried by said piston adapted during its outstroke to admit supplementary air into said cylinder, mechanically actuated means for opening said valve, and other means for varying the opening movement of the latter during operation of the engine.

REINHOLD JOHNSON.